US009457970B1

(12) United States Patent
Zevenbergen et al.

(10) Patent No.: US 9,457,970 B1
(45) Date of Patent: Oct. 4, 2016

(54) MODULAR CROSS-DOCKING SYSTEM

(71) Applicant: Google Inc., Mountain View, CA (US)

(72) Inventors: John Zevenbergen, San Francisco, CA (US); Stefan Nusser, Palo Alto, CA (US); Troy Straszheim, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/792,534

(22) Filed: Jul. 6, 2015

Related U.S. Application Data

(60) Provisional application No. 62/139,844, filed on Mar. 30, 2015.

(51) Int. Cl.
| | | |
|---|---|---|
| B65G 67/02 | (2006.01) | |
| B60P 1/48 | (2006.01) | |
| B62D 63/08 | (2006.01) | |
| B65G 47/90 | (2006.01) | |
| B60P 1/38 | (2006.01) | |
| B60P 1/64 | (2006.01) | |
| B65G 15/22 | (2006.01) | |
| B65G 47/52 | (2006.01) | |
| B25J 5/00 | (2006.01) | |

(52) U.S. Cl.
CPC ............... *B65G 67/02* (2013.01); *B25J 5/007* (2013.01); *B60P 1/38* (2013.01); *B60P 1/48* (2013.01); *B60P 1/6409* (2013.01); *B62D 63/08* (2013.01); *B65G 15/22* (2013.01); *B65G 47/52* (2013.01); *B65G 47/905* (2013.01)

(58) Field of Classification Search
CPC .............................. B65G 67/02; B65G 67/08
See application file for complete search history.

(56) References Cited

U.S. PATENT DOCUMENTS

| | | | | |
|---|---|---|---|---|
| 3,811,579 A | * | 5/1974 | Black | B65G 67/20 414/347 |
| 4,950,118 A | * | 8/1990 | Mueller | G05D 1/0242 180/167 |
| 5,645,390 A | * | 7/1997 | Filiberti | B65G 67/20 15/3 |

(Continued)

FOREIGN PATENT DOCUMENTS

EP    2746078 A1    6/2014

OTHER PUBLICATIONS

Web-page from Intelligrated "Case, tote polybag conveyor" accessed on Feb. 18, 2015 at https://ww.intelligrated.com/case-tote-polybag-conveyor.

(Continued)

*Primary Examiner* — Thomas Randazzo
(74) *Attorney, Agent, or Firm* — McDonnell Boehnen Hulbert & Berghoff LLP

(57) ABSTRACT

An example system includes a plurality of trailers arranged such that a given trailer of the plurality is connected to at least one other trailer of the plurality, where the plurality of trailers includes a plurality of respective conveyance systems to transport objects between connected trailers. The system further includes a control system configured to cause a conveyance system of a first trailer of the plurality to move at least one object to the first trailer from a first external trailer, cause respective conveyance systems of one or more trailers of the plurality to transport the at least one object from the first trailer of the plurality to a second trailer of the plurality that is connected to a second external trailer, and cause a conveyance system of the second trailer of the plurality to move the at least one object to the second external trailer.

26 Claims, 10 Drawing Sheets

(56) References Cited

U.S. PATENT DOCUMENTS

| | | | |
|---|---|---|---|
| 5,794,416 A | 8/1998 | Rahman | |
| 6,158,948 A * | 12/2000 | Calvert | B60P 1/38 |
| | | | 116/63 C |
| 6,524,050 B1 * | 2/2003 | Arntzen | B63B 27/02 |
| | | | 104/98 |
| 6,688,451 B2 * | 2/2004 | Derby | B65G 17/323 |
| | | | 198/346.1 |
| 6,786,509 B2 | 9/2004 | Lang et al. | |
| 7,273,172 B2 | 9/2007 | Olsen, III et al. | |
| 7,695,235 B1 | 4/2010 | Rallis | |
| 7,967,543 B2 * | 6/2011 | Criswell | B65G 67/08 |
| | | | 414/341 |
| 8,047,756 B2 | 11/2011 | Tuffs et al. | |
| 8,156,872 B2 * | 4/2012 | Hathaway | B61B 1/005 |
| | | | 104/27 |
| 8,562,277 B2 | 10/2013 | Criswell | |
| 8,571,700 B2 | 10/2013 | Keller et al. | |
| 8,622,199 B2 | 1/2014 | Windfeld et al. | |
| 8,684,652 B2 | 4/2014 | Byrne et al. | |
| 8,948,907 B2 | 2/2015 | Ugarte Barrena et al. | |
| 2005/0226706 A1 * | 10/2005 | Thomas | B60P 1/38 |
| | | | 414/467 |
| 2007/0160449 A1 * | 7/2007 | Girn | B65G 67/02 |
| | | | 414/390 |
| 2008/0167817 A1 * | 7/2008 | Hessler | G01C 21/005 |
| | | | 701/514 |
| 2012/0095935 A1 * | 4/2012 | Mowat | G06Q 10/08 |
| | | | 705/333 |
| 2012/0253507 A1 | 10/2012 | Eldershaw et al. | |
| 2014/0205403 A1 * | 7/2014 | Criswell | B25J 5/007 |
| | | | 414/395 |
| 2015/0274447 A1 * | 10/2015 | McCollum | B25J 9/0093 |
| | | | 414/792.6 |
| 2015/0352721 A1 * | 12/2015 | Wicks | B25J 9/1664 |
| | | | 700/228 |
| 2015/0360882 A1 * | 12/2015 | Girtman | B65G 59/02 |
| | | | 700/213 |
| 2016/0092834 A1 * | 3/2016 | McCulloch | G06Q 10/087 |
| | | | 705/28 |

OTHER PUBLICATIONS

Web-page from Robot Palletizer LLC. "RPM-8001-11-O/U" accessed on Feb. 18, 2015 at http://www.robotpalletizerconn/rmp800OU-palletizer.html.

* cited by examiner

MODULAR CROSS-DOCKING SYSTEM

CROSS REFERENCE TO RELATED APPLICATION

The present application claims priority to U.S. Provisional patent application Ser. No. 62/139,844, filed on Mar. 30, 2015, and entitled "Modular Cross-Docking System," which is herein incorporated by reference as if fully set forth in this description.

BACKGROUND

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

Example systems and methods involve a group of trailers arranged within a lot so that certain trailers are connected together to allow objects to be moved between the connected trailers. The group of trailers may perform cross-docking operations to move objects between different external trailers that pull up to the lot. For instance, a first external trailer may be connected to a first trailer of the system trailers. A conveyance system of the first trailer may move objects out of the first external trailer and into the system of connected trailers. Some of the objects may be transported to a second trailer of the system trailers by one or more conveyance systems of the connected trailers, possibly including robotic manipulators and/or conveyors. The objects may then be moved from the second trailer to a second external trailer that pulls up to the lot and connects with the second trailer.

In one example, a system is disclosed including a plurality of trailers arranged such that a given trailer of the plurality is connected to at least one other trailer of the plurality, where the plurality of trailers comprises a plurality of respective conveyance systems to transport objects between connected trailers. The system may also include a control system configured to cause a conveyance system of a first trailer of the plurality to move at least one object to the first trailer from a first external trailer that is connected to the first trailer. The control system may be further configured to cause respective conveyance systems of one or more trailers of the plurality to transport the at least one object from the first trailer of the plurality to a second trailer of the plurality that is connected to a second external trailer. The control system may also be configured to cause a conveyance system of the second trailer of the plurality to move the at least one object to the second external trailer.

In a further example, a method is provided that includes moving, by a conveyance system of a first trailer of a plurality of connected trailers, at least one object to the first trailer of the plurality from a first external trailer that is connected to the first trailer of the plurality. The method may further include transporting, by respective conveyance systems of one or more trailers of the plurality of connected trailers, the at least one object from the first trailer of the plurality to a second trailer of the plurality that is connected to a second external trailer. The method may also include moving, by a conveyance system of the second trailer of the plurality, the at least one object from the second trailer of the plurality to the second external trailer.

In another example, a control system is disclosed including at least one processor, and data storage comprising instructions executable by the at least one processor to the cause the control system to perform functions. The functions include identifying at least one object within a first external trailer for transport to a second external trailer. The functions further include causing a conveyance system of a first trailer of a plurality of connected trailers to move the at least one object to the first trailer of the plurality from the first external trailer, where the first external trailer is connected to the first trailer of the plurality. The functions additionally include causing respective conveyance systems of one or more trailers of the plurality of connected trailers to transport the at least one object from the first trailer of the plurality to a second trailer of the plurality that is connected to the second external trailer. The functions further include causing a conveyance system of the second trailer of the plurality to move the at least one object from the second trailer of the plurality to the second external trailer.

In yet another example, a system may include means for moving at least one object to the first trailer of the plurality from a first external trailer that is connected to the first trailer of the plurality. The system may further include means for transporting the at least one object from the first trailer of the plurality to a second trailer of the plurality that is connected to a second external trailer. The system may also include means for moving the at least one object from the second trailer of the plurality to the second external trailer.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
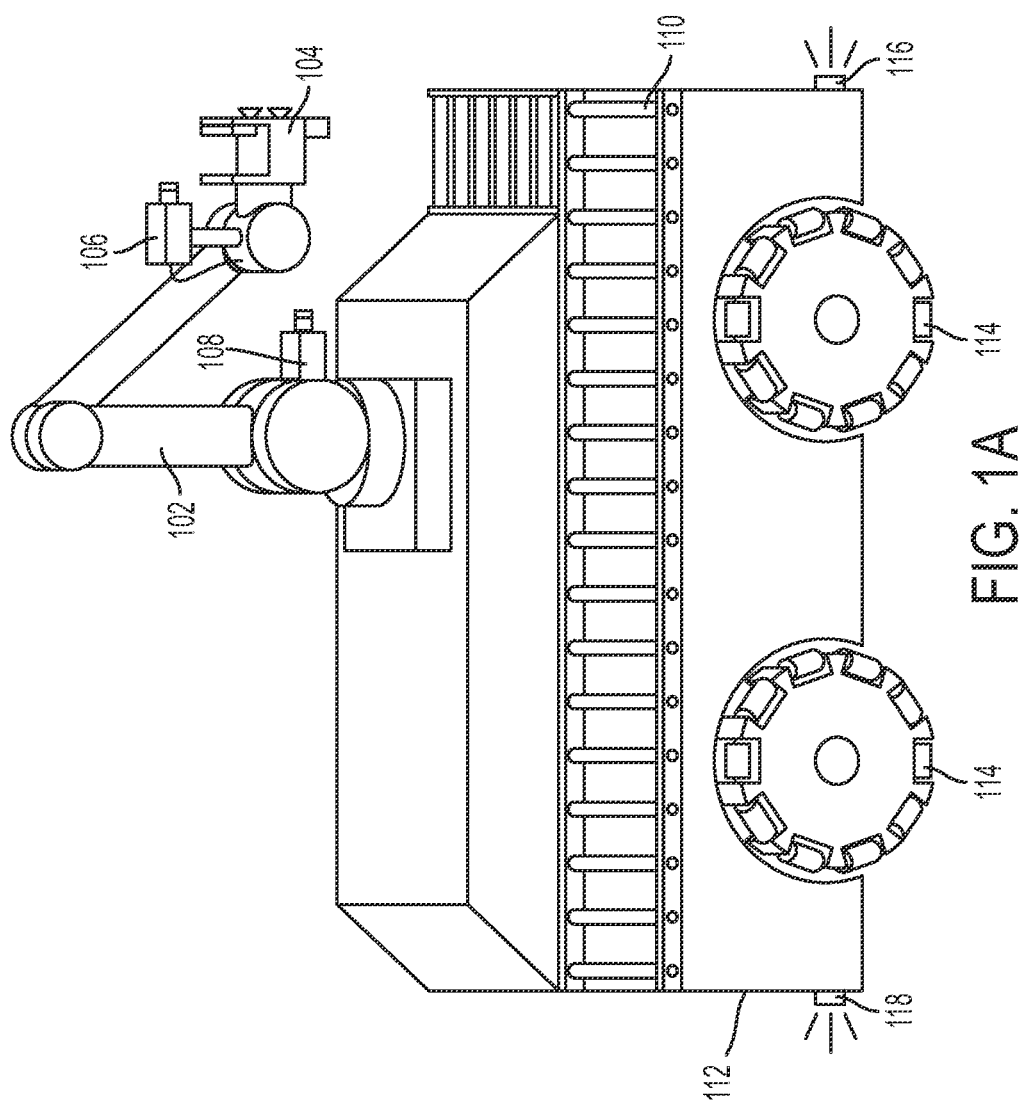
FIG. 1A shows a robotic arm mounted on a moveable cart, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

An example modular cross-docking system may involve a group of trailers arranged within an area, such as an empty parking lot, so that certain trailers of the group are connected. Each trailer may be equipped with a conveyance system involving one or more robotic manipulators and/or conveyors to move objects such as boxes to a connected trailer. The trailers may be connected together in different arrangements in order to create temporary distribution center setups of variable size on lots with potentially limited space. For instance, the system could be put together for cross-docking operations to move boxes between different external trailers that pull up to the lot and connect with one of the system trailers. Other functions may also be performed by the system of connected trailers as well, including sorting boxes, palletizing boxes, and determining box metrology.

Individual trailers may have different sizes and/or perform different functions within the system. Additionally, each trailer may be equipped with different types of equipment (e.g., a robot arm for truck unloading or a multi-level conveyor system for sorting) depending on its particular assigned functions. Modularizing pieces in movable units that perform dedicated functions provides a system with flexibility that can be rapidly set up or adapted to particular spaces or needs. A central control system, which itself may be placed in one of trailers, may communicate instructions to local control systems of individual trailers and/or to other components of individual trailers. For instance, the control system may organize the trailers within a lot and provide instructions to specify where incoming boxes are directed by the connected trailers.

As a specific example, the system may include several relatively short (e.g., 20-foot long) trailers that each contain a truck unloading robot arm for loading and/or unloading boxes from adjacent, connected trailers. Several of these trailers may be connected to different side doors of a longer (e.g., 53-foot long) central trailer which contains one or more conveyors to move boxes between different connected trailers. This system may be used to move boxes between different external trailers that pull into the lot. For instance, an external trailer may be connected to the front of one of the trailers with a truck unloading robot arm. The robot arm may be controlled to move boxes between the external trailer and a conveyor of the system's central trailer for delivery through the system of connected trailers to and/or from other external trailers. Accordingly, a particular external trailer may be loaded with boxes from several different connected external trailers before being dispatched for delivery.

As noted, individual trailers may be equipped with a variety of different components to perform different functions. Within examples, possible modular system pieces include robot truck loaders/unloaders, single conveyors, multi-level conveyors, sorting conveyors, dedicated sorting robots (e.g., robot arms that move objects to particular sorting locations and/or particular conveyance systems), dedicated palletizing robots (e.g., robot arms that build a pallet of boxes received from one or more external trailers for delivery to another external connected trailer), box metrology identification systems (e.g., a trailer with optical sensors and/or other types of sensors), as well as control systems (e.g., a control system with a user interface for user input located in a separate, unconnected trailer).

In some examples, a central control system may be a cloud-computing system that may be used to organize the system of trailers for different types of operations. For instance, the central control system may automatically position the different system components (or reposition particular components over time) in order to enable the system to handle different incoming loads within a particular geographic space. The system therefore can become a lightweight, cross-docking distribution facility with no additional infrastructure required besides the mobile trailers.

Each trailer may encapsulate a robot in a structured and standardized work environment. To facilitate robotic operation, the trailers may be equipped with appropriate lighting, floor covers, and/or built-in safety sensors. Additionally, each trailer may be equipped with its own control unit, network communication system (e.g., a 4G uplink and a WiFi connection), and power system (e.g., a transformer and/or generator). Once a trailer is built, it may be deployable without an additional safety audit. Each trailer may therefore serve as a mobile "robot cell" that is a self-contained piece of a mobile warehouse. Structured encapsulation of robotic operation may greatly reduce safety concerns and improve deployment time of a mobile cross-docking system.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Of course, examples herein may be applied toward objects other than boxes as well, and toward objects of various sizes and shapes.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap around front conveyor belt 110 may be included on the holonomic cart 112. In some examples, the wrap around front conveyor belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 1B:
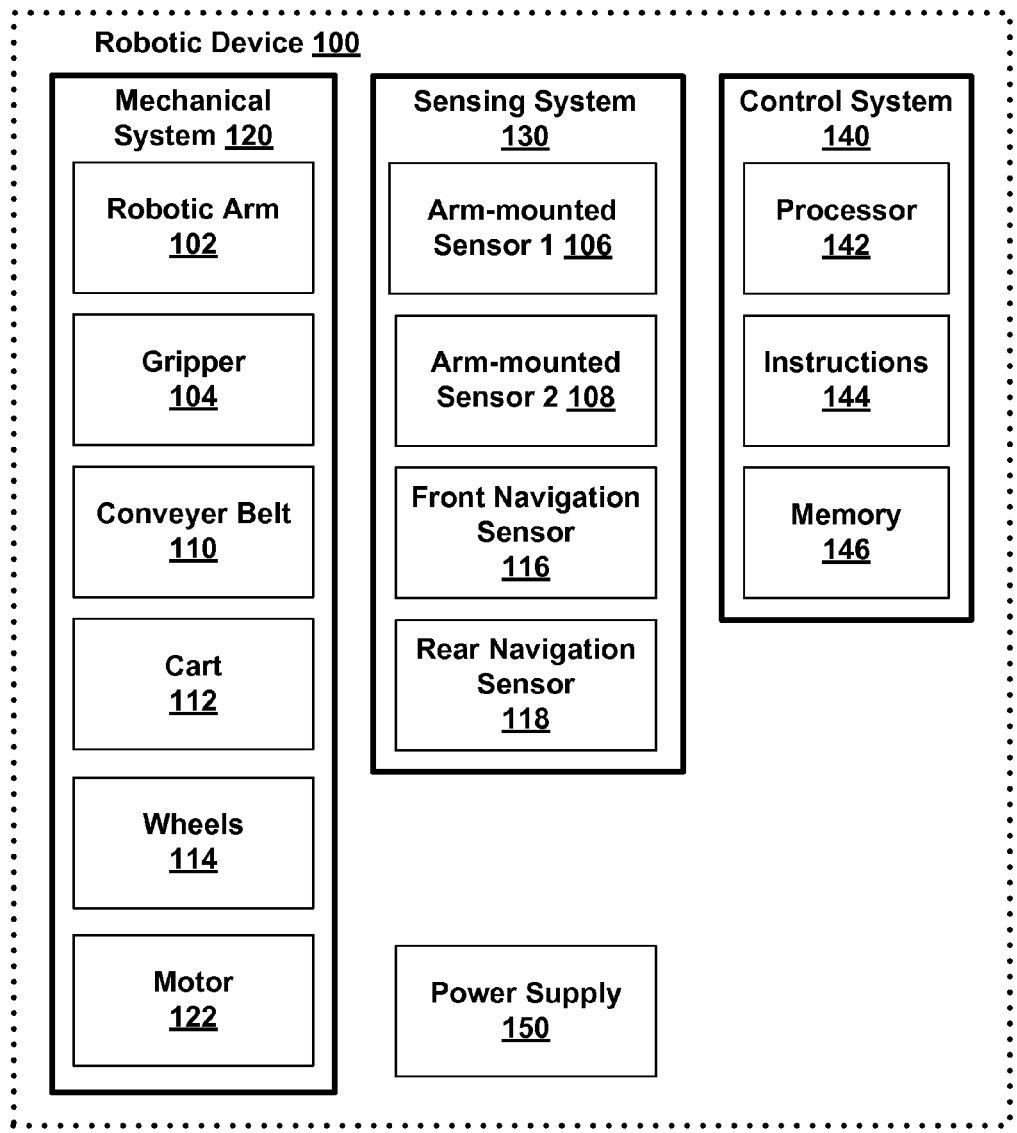
FIG. 1B is a functional block diagram illustrating a robotic device, according to an example embodiment.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic arm 102, a gripper 104, a conveyor belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
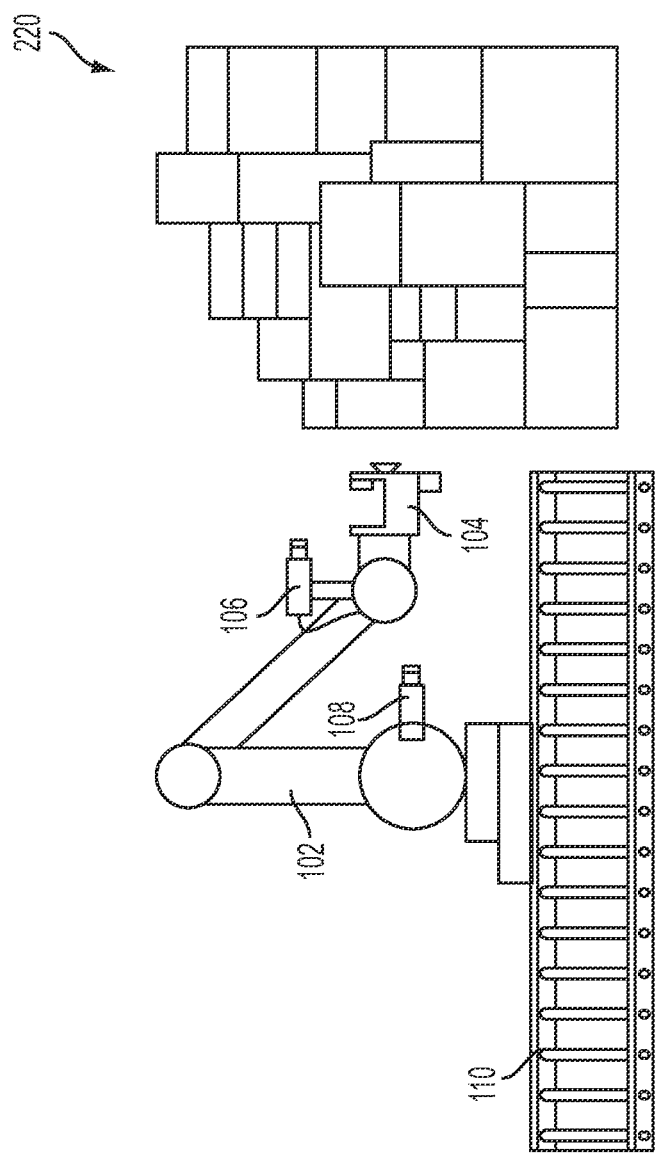
FIG. 2A shows a robotic arm and a stack of boxes, according to an example embodiment.

According to various embodiments, a perception-guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyor 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogenous mix of shapes and sizes of boxes.

Figure 2B:
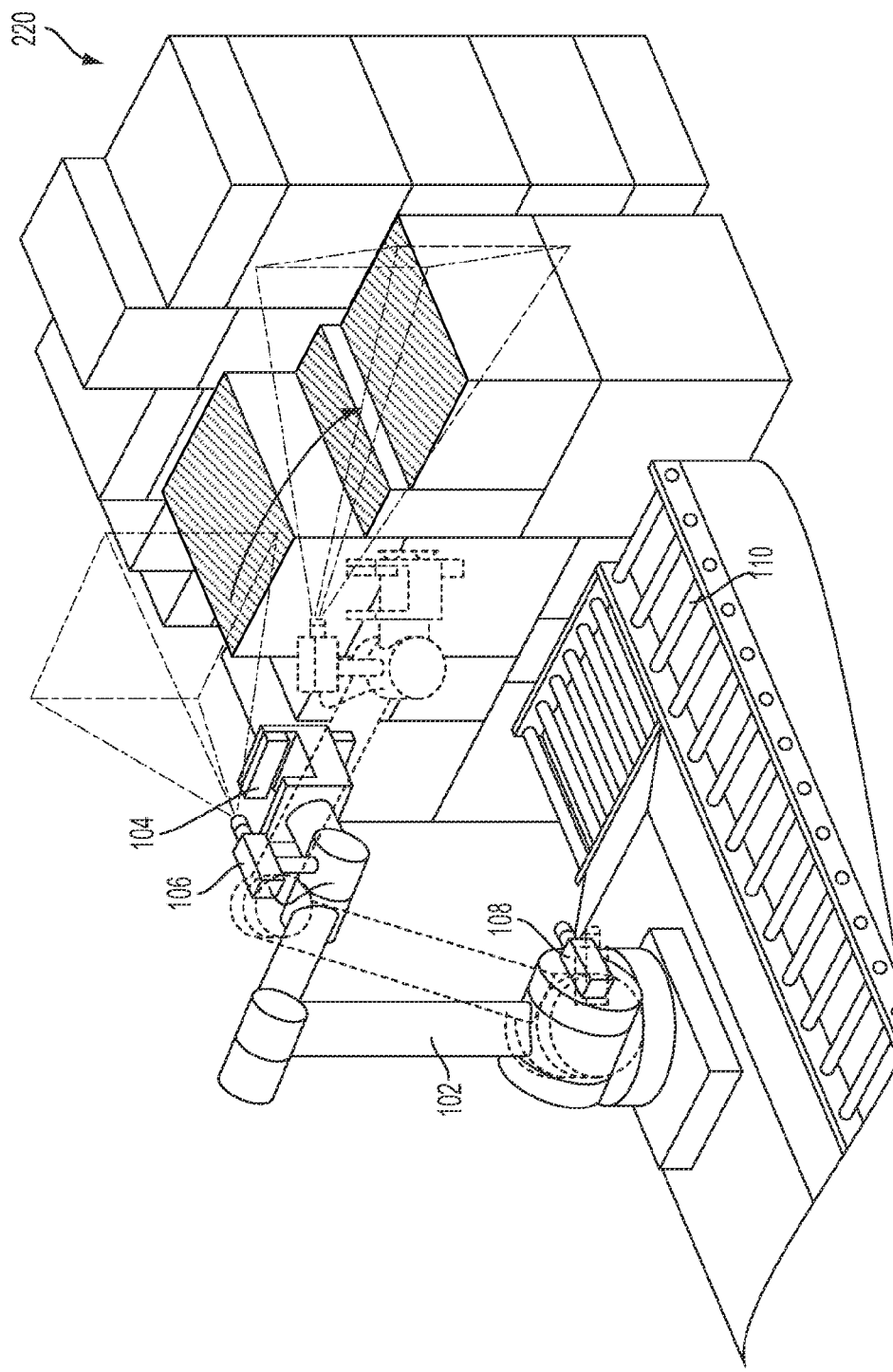
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking keypoints in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
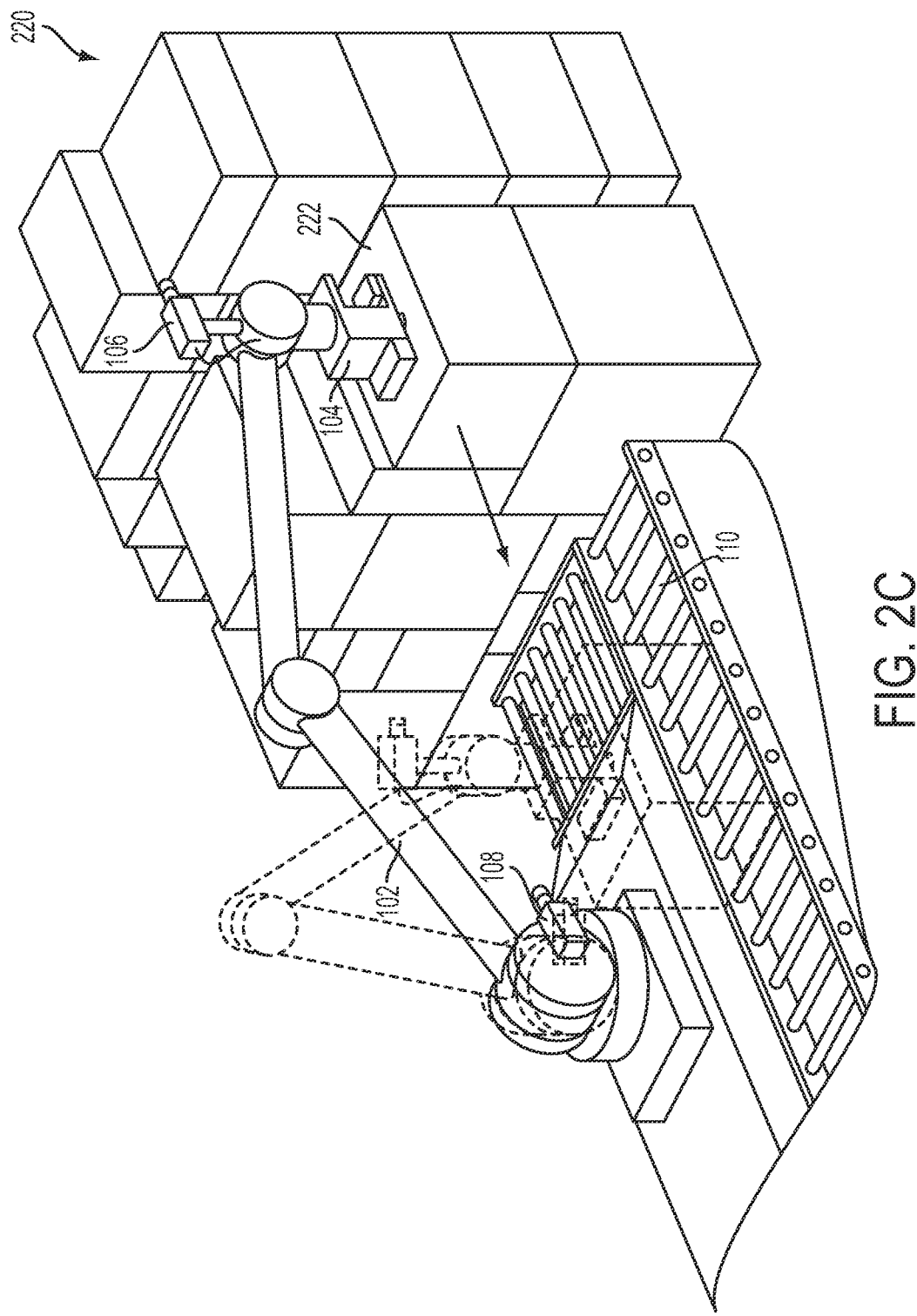
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyor belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combine to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement).

In some examples, the process may be repeated until all the boxes have been placed or the target container can no longer fit in another box.

Figure 3A:
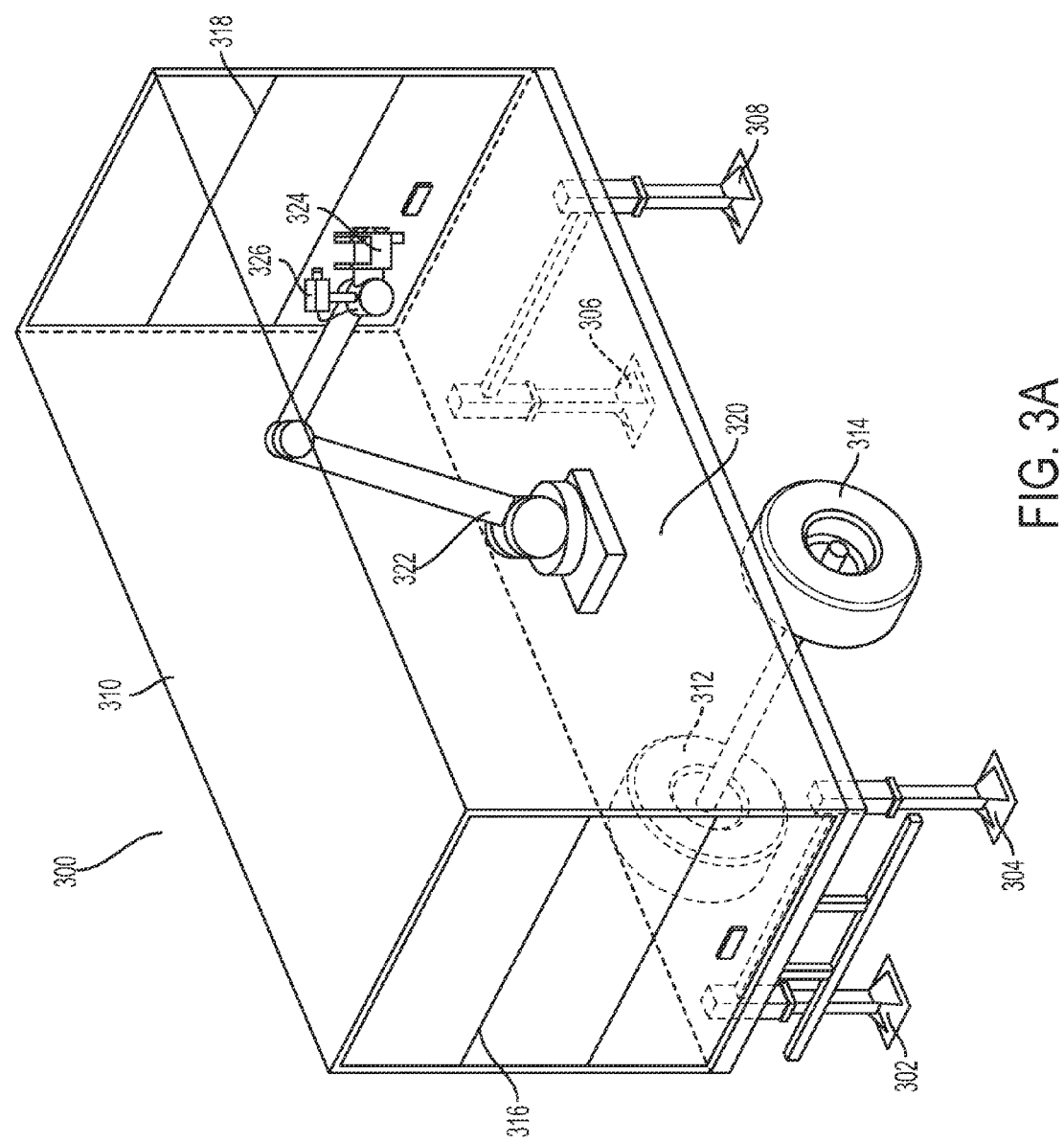
FIG. 3A illustrates a modular trailer, according to an example embodiment.

FIG. 3A illustrates a modular trailer, according to an example embodiment. More specifically, the trailer shown may be one type of trailer used within a system of connected trailers for cross-docking operations. Within examples, a trailer is an enclosed rectangular container with at least one openable surface for connection to another trailer. Additionally, a trailer is designed so that it can be hauled by a truck or a different mobile vehicle. The trailer may itself have one or more sets of opposing wheels for transport, or it may be a container with no wheels that can be loaded onto a separate wheeled trailer for transport. Additionally, a system trailer includes at least one conveyance system for moving objects. Within examples, a conveyance system is a mechanically operable component configured to move an object through the container of the trailer. For instance, a conveyance system may include a robotic arm, a conveyor, or both.

As illustrated in FIG. 3A, an example trailer 300 includes rectangular container 310 with a robotic manipulator 322 that is contained within the interior space of the container 310. For instance, the robotic manipulator 322 may be mounted to the floor 320 of the container 310 by fixing the base of the robot 322 to the floor 320. The robotic manipulator 322 may be configured to move objects to or from the container 310 when one or both of the back end 316 and the front end 318 are opened. For instance, the robot 322 may be used to unload objects from an external trailer connected at the front end 318 and move the objects to another system trailer connected at the back end 316 of the container 310. The objects may then be transported through a system of connected trailers to one or more other external trailers.

Within examples, the rectangular container 310 encloses a three-dimensional rectangular space that is large enough to enable movement of the robotic manipulator 322 within the container 310. One or more axles with corresponding left and right wheels 312, 314 may be attached to allow the trailer 300 to be hauled by a truck to a lot such as a parking lot. The trailer 300 may be a semi-trailer as shown in FIG. 3A with only a rear axle, and without a front axle. One or more system trailers may also be full trailers with front wheels attached to a front axle and rear wheels attached to a rear axle as well.

The container 310 may have a height and width comparable to standard semi-trailers (e.g., an overall height of 13.5 feet with rear door dimensions of 94 in. width×104 in. height) to allow for close-fitting connection with external trailers. Additionally, the container 310 may have a length substantially shorter than full-sized 53-foot semi-trailers. For instance, the container 310 may have a length that is approximately half of a full-sized semi-trailer. In another example, the container 310 may have a length of approximately 20 feet. By using this form factor, the trailer 300 may be fit into tighter spaces within a parking lot or other setup location, while still being long enough to haul with a truck. In other examples, the container 310 may have different dimensions as well. Other system trailers may have the same dimensions, or different dimensions.

The trailer 300 may additionally include one or more rear supporting bases, shown in FIG. 3A as rear left leg 302 and rear right leg 304 positioned proximate to the rear end of container 310. For instance, the rear legs 302, 304 may be positioned at the very end of the container 310, one foot away from the end, or three feet away from the end. Additionally, the rear left leg 302 may be positioned proximate to the left edge of the container 310 (e.g., at the left edge of the container 310, or a certain distance away from the left edge). Further, the rear right leg 302 may be positioned proximate to the right edge of the container 310 (e.g., at the right edge of the container 310, or a certain distance away from the right edge).

Each of the rear legs 302, 304 may be extendable from the bottom of the container 310 to the ground in order to adjust alignment of the rear end of the container 310. In particular, each of the rear left leg 302 and the rear right leg 304 may be extended or retracted in order to adjust the distance between the floor 320 of container 310 and the ground at the rear end of the container 310. The rear left leg 302 and the rear right leg 304 may be adjusted to different heights to change the tilt or angle of the floor 320 at the rear of the container 310 relative to the ground as well or instead.

The trailer 300 may also include one or more front supporting bases, shown in FIG. 3A as front left leg 306 and front right leg 308 positioned proximate to (e.g., at or near) the front end of container 310. Each of the front legs 306, 308 may be extendable from the bottom of the container 310 to the ground in order to adjust alignment of the front end of the container 310. In particular, each of the front left leg 306 and the front right leg 308 may be extended or retracted in order to adjust the distance between the floor 320 of container 310 and the ground at the front end of the container 310. The front left leg 306 and the front right leg 308 may be adjusted to different heights to change the tilt or angle of the floor 320 at the front of the container 310 relative to the ground as well or instead.

The floor 320 of the container 310 may be constructed to allow a certain amount of bend (e.g., up to 6 inches or up to 2 feet) to allow for simultaneous adjustment of any combination of the four legs 302-308. In further examples, more or fewer legs may be used and/or one or more legs may be positioned at different locations on the container 310. For instance, in one example, a trailer may contain two rear legs and a single front leg. The three legs may define a plane controlling how the floor of the trailer is oriented. In such an example, all three of the legs may be adjusted to align the trailer both on the back end and on the front end. Other arrangements of the legs are also possible.

Within examples, the load levelers 302-308 may take on various different shapes or forms. Referring to FIG. 3A, each leg may include an internal square-shaped piece that slides out from an external square-shaped holder for height adjustment. An actuator corresponding to each leg may be used to cause extension or retraction of the leg. For example, the trailer 300 may contain four separate hydraulic actuators that use hydraulic fluids to adjust heights of each of the four legs. In some examples, separate fittings may be used to attach each of the legs 302-308 to the bottom of the container 310. Other types of actuators and/or forms or shapes of load levelers may also be used.

The container 310 of the trailer 300 may be enclosed and the legs 302-308 may be retracted during transport of the trailer 300 (e.g., hauling by a truck). Additionally, the front end and the rear end of the container 310 may be openable in order to allow objects to pass through the container 310 from the front to the back, or the back to the front. In one example, the rear end of the container 310 may be opened after backing the trailer 300 up to another trailer, and then the heights of the back legs 302, 304 may be adjusted to align with the back-connected trailer. Additionally, the front end of the container 310 may be opened after another trailer is connected at the front, and then the heights of the front legs 306, 308 may be adjusted to align with the front-connected trailer.

As shown in FIG. 3A, the rear end of the container 310 may include a roll door 316 which slides up to open the rear of the container 310 (e.g., to a back-connected trailer). In other examples, a different type of door such as a swing door may be used instead. In further examples, the rear end of the container 310 may only be partially openable. For instance, a rear door may be configured to slide up only enough to allow boxes to pass underneath on a conveyor. Such a design may be used, for example, to ensure that the robotic manipulator 322 cannot move outside of the back end of the container 310 and interfere with operation within another system trailer.

The front end of the container 310 may also include a roll door 318 which slides up to open the front of the container 310 (e.g., to a front-connected trailer). The front door 318 and the rear door 316 may be of the same type or they may be of different types. The front door 318 may also be fully openable or only partially openable.

In some examples, the front end and/or the rear end of the container 310 may also include a metal plate (e.g., positioned on the floor 320 of the container 310) that can be flipped into a connected trailer to transition into the connected trailer. Such a metal plate may be used to help level the container 310 with a connected trailer. The metal plate may also be used to help level a piece of conveyor (e.g., that is placed on top of the metal plate after it has been flipped into a connected trailer) as well.

Within examples, the robotic manipulator 322 of the trailer 300 is a mechanically operable device with at least one mechanical component for moving objects such as boxes. For example, the robotic manipulator 322 may be a robotic arm with an end-effector-mounted gripper 324. The robotic manipulator 322 may include any of the components or systems described in reference to the robotic truck unloader illustrated by FIGS. 1A-1B and 2A-2C. For instance, the robotic manipulator 322 may include at least one attached optical sensor 326 to assist with object identification during object movement. One or more optical sensors may be fixed within the container 310 to detect objects or determine properties of objects moved within the container 310 as well or instead.

The robotic manipulator 322 may be mounted to the floor 320 of the container 310 to facilitate automated object manipulation after the floor 320 has been aligned with a back-connected trailer and a front-connected trailer. For instance, the robotic manipulator 322 may be operating on substantially the same plane as the floor of both the back-connected trailer and the front-connected trailer. The alignment process may therefore take strain off the system as the robot operates and/or may stabilize the system to prevent rocking or tipping of any of the trailers.

The robotic manipulator 322 may be mounted to the floor 320 of the container 310 in various ways. For instance, as shown in FIG. 3A, a base of the robotic manipulator 322 may be affixed or attached to the floor 320. In other examples, a different component of the robotic manipulator 322 may be mounted to the floor instead. In further examples, the floor 320 of the container 310 may be constructed with the robotic manipulator 322 built in to a part of the floor 320. In other examples, the robotic manipulator 322 may be mounted to rails on the floor 320 which may allow for horizontal movement of the robotic manipulator 322 within the container 310. Different components may be used to move the robotic manipulator 322 along the floor 320 as well.

In further examples, a system trailer may contain a robotic manipulator positioned elsewhere within container 310. For instance, a robotic manipulator could be mounted to a ceiling or to a side wall. In additional examples, a trailer may also contain multiple robotic manipulators, possibly of different types and/or mounted at different positions within the container 310 as well.

The trailer 300 may also contain a local control system to autonomously operate robotic manipulator 322. In some examples, the local control system may receive instructions from a central control system. For instance, the central control system may instruct the local control system to move a particular box from a connected trailer, and then the local control system may determine operations to cause the robotic manipulator 322 to move the particular box through container 310. The local control system may be fixed within the container 310, or it may also be removable so that it can be placed outside the trailer and operated by a human operator via a user interface. In further examples, the local control system may be capable of performing any of the functions for a control system of a robotic truck loader/unloader described previously in reference to FIGS. 1A-1B, and 2A-2C.

In additional examples, the local control system may additionally interface with one or more of the supporting bases 302-308. For instance, the local control system may determine that the container 310 is tilting, bouncing, or otherwise moving beyond a certain threshold amount during robotic object manipulation. In response, the local control system may cause an adjustment in height of at least one of the bases in an effort to stabilize the container 310.

In further examples, the local control system may also determine one or more metrics of objects that are moved within the container 310, such as dimensions, weight, center of mass, value, and/or identifying information. This information may be determined using sensor data from one or more sensors coupled to the robotic manipulator 322 and/or contained within container 310. The trailer 300 may also contain a network communication system to allow the local control system to transmit this information to a central control system and/or to control systems of other trailers so that system trailers may have information about incoming boxes before they arrive.

In additional examples, the local control system may also use determined box metrics to adjust the height of one or more of the supporting bases 302-308. For example, the local control system may identify a particularly heavy object, and may responsively adjust one or more of the bases to prevent the heavy object from causing an excessive amount of movement of the trailer 300 when the heavy object is moved by the robotic manipulator 322.

Figure 3B:
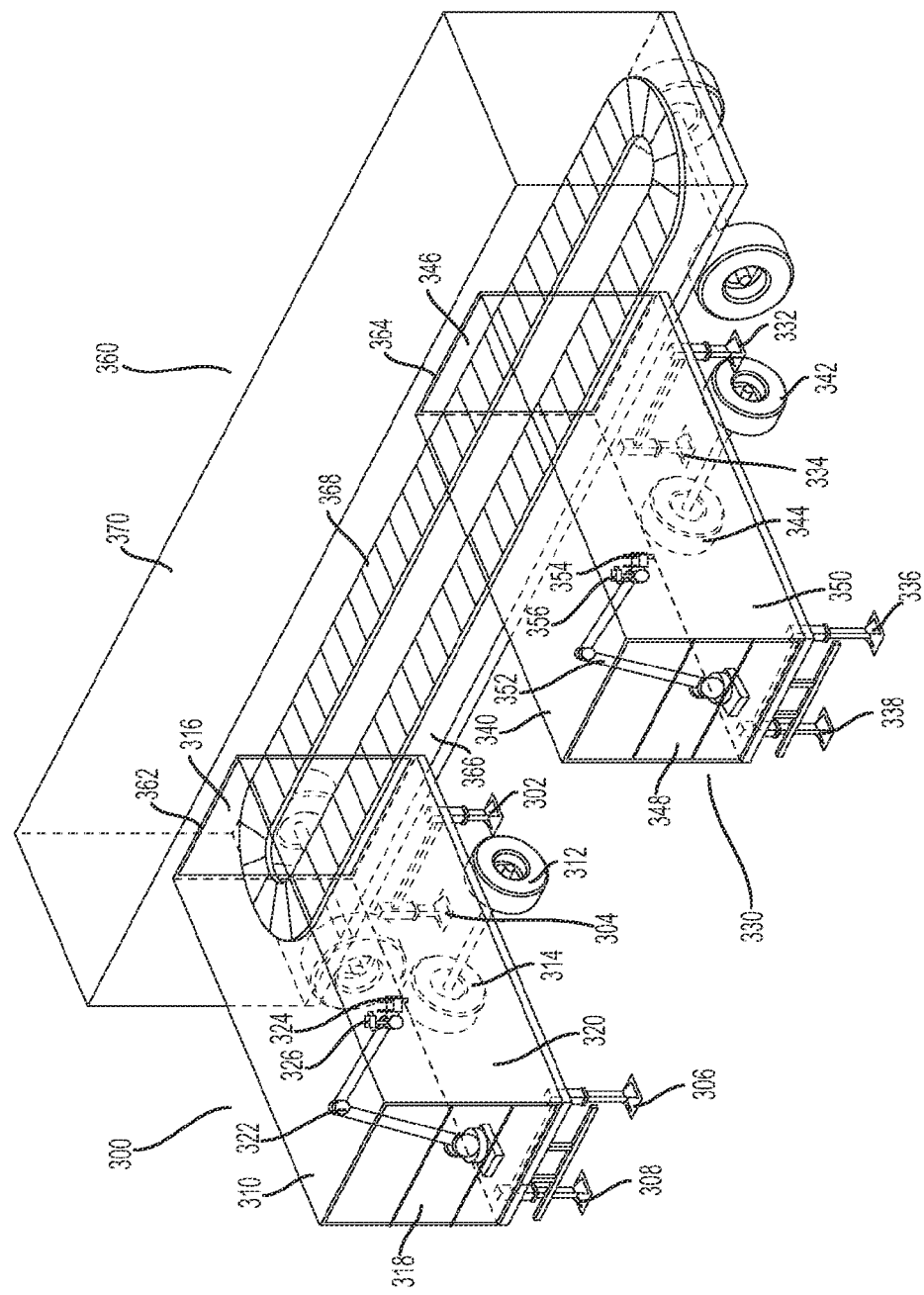
FIG. 3B illustrates a system of connected trailers, according to an example embodiment.

FIG. 3B illustrates a system of connected trailers, according to an example embodiment. More specifically, a first trailer 300 and a second trailer 330 are both connected to a third trailer 360. The first trailer 300 may be a relatively short half-trailer containing a truck unloading robot arm 322 for moving objects to and/or from container 310. Similarly, the second trailer 330 may also be a half-trailer containing a truck unloading robot arm 352 for moving objects to and/or from container 340. The third trailer 360 may be a longer full-trailer containing a conveyor 368 for transporting objects to and/or from connected trailers, such as the first trailer 300 and the second trailer 330. Other arrangements of trailers and/or trailer components are also possible.

Two trailers of the system may be connected by aligning openable surfaces of the two trailers so that objects may be transported between the trailers through the openings. Within examples, an openable surface of a trailer may be a door located at the front, back, or side of the trailer. In some examples, the openable surfaces of two connected trailers may lock together or otherwise become rigidly attached. In other examples, the openable surfaces may simply be aligned to enable object transport, but kept a certain distance apart. In further examples, connection may be established by extending a component of one or both trailers between the two trailers. For instance, a metal floor plate or piece of flexible conveyor may be extended over the floors of the two connected trailers.

In some examples, multiple system trailers may be connected to a single trailer. As shown in FIG. 3B, the first trailer 300 may be backed up to an openable surface 362, such as a side door, of the third trailer 360. Additionally, the rear door 316 of the trailer 300 may be opened so that objects may pass between the container 310 of the first trailer 300 and the container 370 of the third trailer 360. Further, a second trailer 330 may be hauled to the lot using wheels 342, 344, and backed up to an openable surface 364, such as another side door, of the third trailer 360. Additionally, the rear door 346 of the second trailer 330 may be opened so that objects may pass between the container 340 of the second trailer 330 and the container 370 of the third trailer 360.

Each of the first trailer 300 and the second trailer 330 may be separately aligned with different openings of the third trailer 360. In particular, the rear load levelers 302, 304 of the first trailer 300 may be actuated to align the floor 320 at the rear of the container 310 with the floor 366 of the container 370. Each load leveler 302, 304 may be adjusted to a different height. For instance, right leg 304 may be adjusted to a greater height than left leg 302. This adjustment may allow the trailer 300 to adjust alignment for unevenness of the ground within the lot. In some examples, the adjustment may be automated, such as by controlling actuation of the legs 302, 304 by a local control system of the trailer 300 and/or a central control system. In other examples, the adjustment may be done manually (e.g., by a human operator). In a similar manner, the rear load levelers 332, 334 of the second trailer 330 may also be actuated to align the floor 350 at the rear of the container 340 with the floor 366 of the container 370.

The particular arrangement of trailers in a lot may be determined based on the trailers currently available, the size and shape of the lot, and/or the expected demand from external trailers. In some examples, a central control system may autonomously control positioning of the trailers within a lot. For example, the control system may operate one or more autonomous vehicles (e.g., autonomous trucks) or mobile robotic devices to haul or otherwise maneuver trailers within the lot. In other examples, system trailers may be manually positioned within a lot as well or instead. In the case of manual positioning, a control system may provide instructions (e.g., driving directions) to a human operator indicating where to position each of the trailers as well.

In further examples, trailers may be positioned within a lot to accommodate expected incoming external trailers. For instance, a control system may determine the number of external trailers expected within a particular period of time that will require robotic truck loading and/or unloading. Based on the expected number of incoming trailers, the control system may determine a number of open connections to system trailers with robotic truck unloaders to make available for connection to external trailers. The control system may then determine how to position the system trailers within a lot to provide the determined number of open connections. Additionally, the positioning may be done dynamically as the demands from incoming external trailers change. For instance, system trailers may be arranged as in FIG. 3B such that two open connections to system trailers with robotic truck unloaders are available for external trailers. If demand increases, additional system trailers may be added and/or certain system trailers may be repositioned within a lot to make additional system trailers with robotic truck unloaders available to external trailers.

In additional examples, trailers may be positioned within a lot to accommodate expected incoming external trailers by providing access to other types of functions besides truck loading/unloading. For instance, it may be determined that a particular incoming trailer will need to be loaded with pallets of objects from one or more other trailers. Accordingly, the system trailers may be positioned within a lot so that the objects will pass through a palletizing trailer with a palletizing robotic manipulator which will be configured to construct pallets for delivery to the particular incoming trailer once it arrives. In further examples, the palletizing trailer with the palletizing robotic manipulator may also contain a conveyance system, such as one or more conveyors, to load the constructed pallets onto the external trailer as well.

In further examples, a central control system may be positioned in a separate control trailer that is not connected to the system of connected trailers. The central control system may include a network communication system, possibly including a 4G uplink and a WiFi connection, for communicating instructions to local control systems of individual trailers and/or for communication information (e.g., about incoming or outgoing packages) to an external system. The central control system may also have a separate user interface to allow a user to direct system operation, which may be more easily accessed if the central control system is placed in an unconnected system trailer.

Figure 3C:
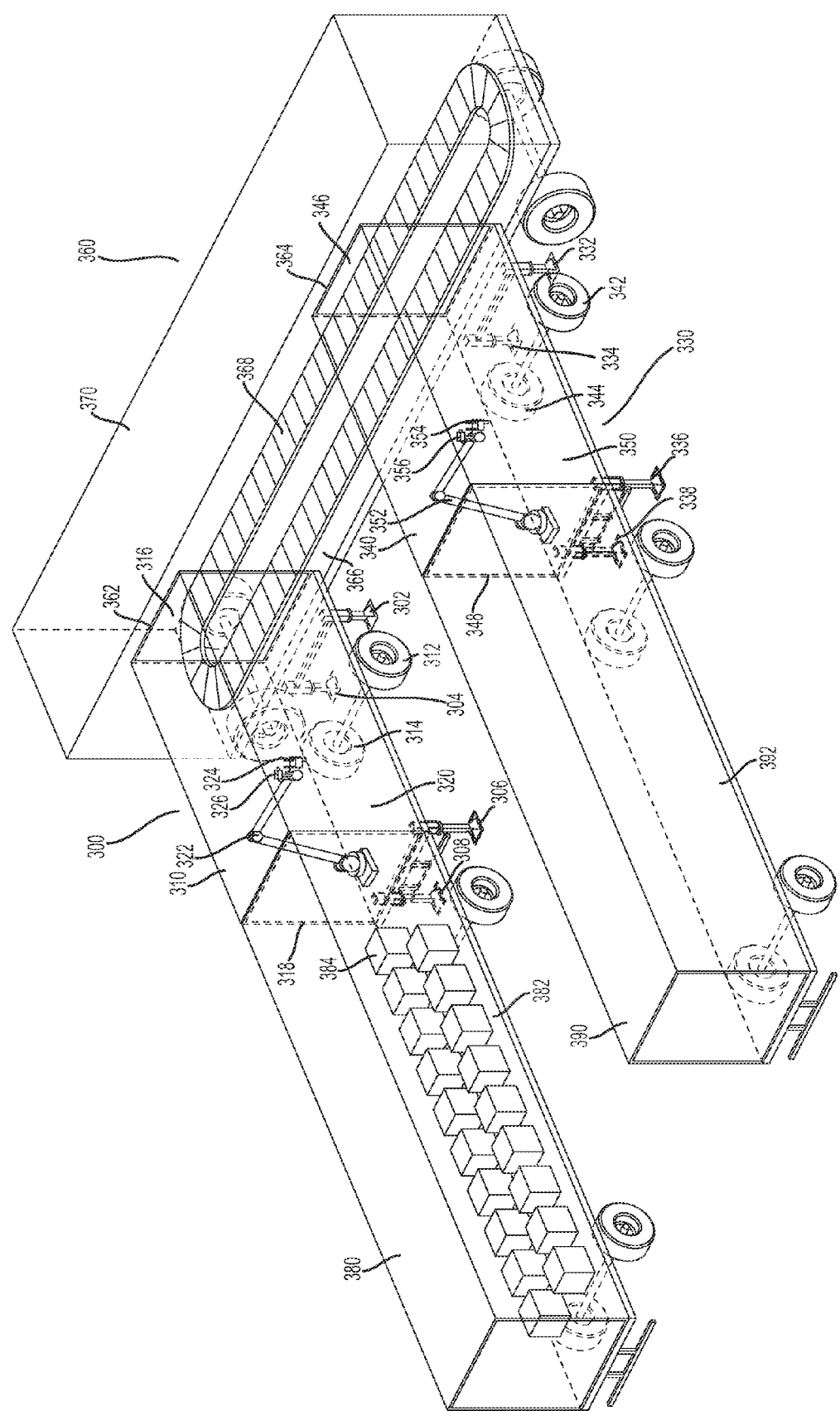
FIG. 3C illustrates a system of connected trailers with two external trailers, according to an example embodiment.

FIG. 3C illustrates a system of connected trailers with two external trailers, according to an example embodiment. After connecting the first trailer 300 and the second trailer 330 to the third trailer 360, two external trailers 380, 390 may be connected to the system of connected trailers. In particular, a first external trailer 380 may be positioned at the front end of the first system trailer 300 and the second external trailer 390 may be positioned at the front end of the second system trailer 330. In this manner, the system trailers 300, 330 with the robotic truck loaders/unloaders may therefore provide access to the system of connected trailers for external trailers which arrive at the lot. Within examples, an external trailer is a wheeled unit designed to carry freight. An external trailer may have a number of different possible designs, shapes, and dimensions. In one example, an external trailer may be a standard 53-foot long semi-trailer or full-trailer that is operated to deliver boxes to and/or from a lot containing a system of connected trailers.

In order to enable movement of boxes to and/or from external trailer 380, the front door 318 of the first system trailer 300 may be partially or fully opened. Additionally, the front legs 306, 308 of the trailer 300 may be adjusted in height in order to align the floor 320 of the container 310 with a floor 382 of the external trailer 380. Multiple front legs 306, 308 with independently adjustable heights may allow the system trailer 300 to align with a number of different makes and models of trailers with sufficient precision to enable robotic manipulator 322 to move boxes to and/or from external trailer 380. Additionally, separately actuable front legs 306, 308 may also allow the trailer 300 to adjust for unevenness in a lot. The front legs 306, 308 may be adjusted to align the system trailer 300 with external trailer 380 based on instructions from an automated control system and/or by manual operation of the corresponding actuators.

In some examples, each of the load levelers 302-308 of the system trailer 300 may be adjusted in order to align the system trailer 300 with both the back-connected system trailer 360 and the front-connected external trailer 380. For instance, heights for each leg of the trailer 300 may be chosen in an effort to orient the floor 382 of the external trailer 380, the floor 320 of system trailer 300, and the floor 366 of system trailer 360 along roughly the same plane. By keeping each component aligned, control instructions for the robotic manipulator 322 may be determined without the need for additional transformations. Additionally, objects such as box 384 may be moved from the external trailer 380 through system trailer 300 into system trailer 360 while minimizing rocking, tipping, or other motion of each of the trailers. In further examples, one or more conveyors may also be aligned along the same plane, or parallel to the same plane, to facilitate moving objects in conjunction with robotic manipulator 322. Example conveyors include one or more conveyors extending from system trailer 300 into external trailer 380, one or more conveyors fixed or otherwise contained within system trailer 300, and/or one or more conveyors extending from system trailer 300 into system trailer 360.

A second external trailer 390 may be connected to the second system trailer 330 in a similar manner. In particular, the front door 348 of the second system trailer 330 may be partially or fully opened. Additionally, the front legs 336, 338 of the second system trailer 330 may be adjusted in height in order to align the floor 350 of the container 340 with a floor 392 of the second external trailer 390. Accordingly, two separate external trailers may be provided access to the system of connected trailers for cross-docking (e.g., to move one or more objects between the two external trailers). In further examples, additional external trailers may also be connected to additional system trailers (e.g., additional system trailers equipped with their own robotic truck unloaders).

Figure 3D:
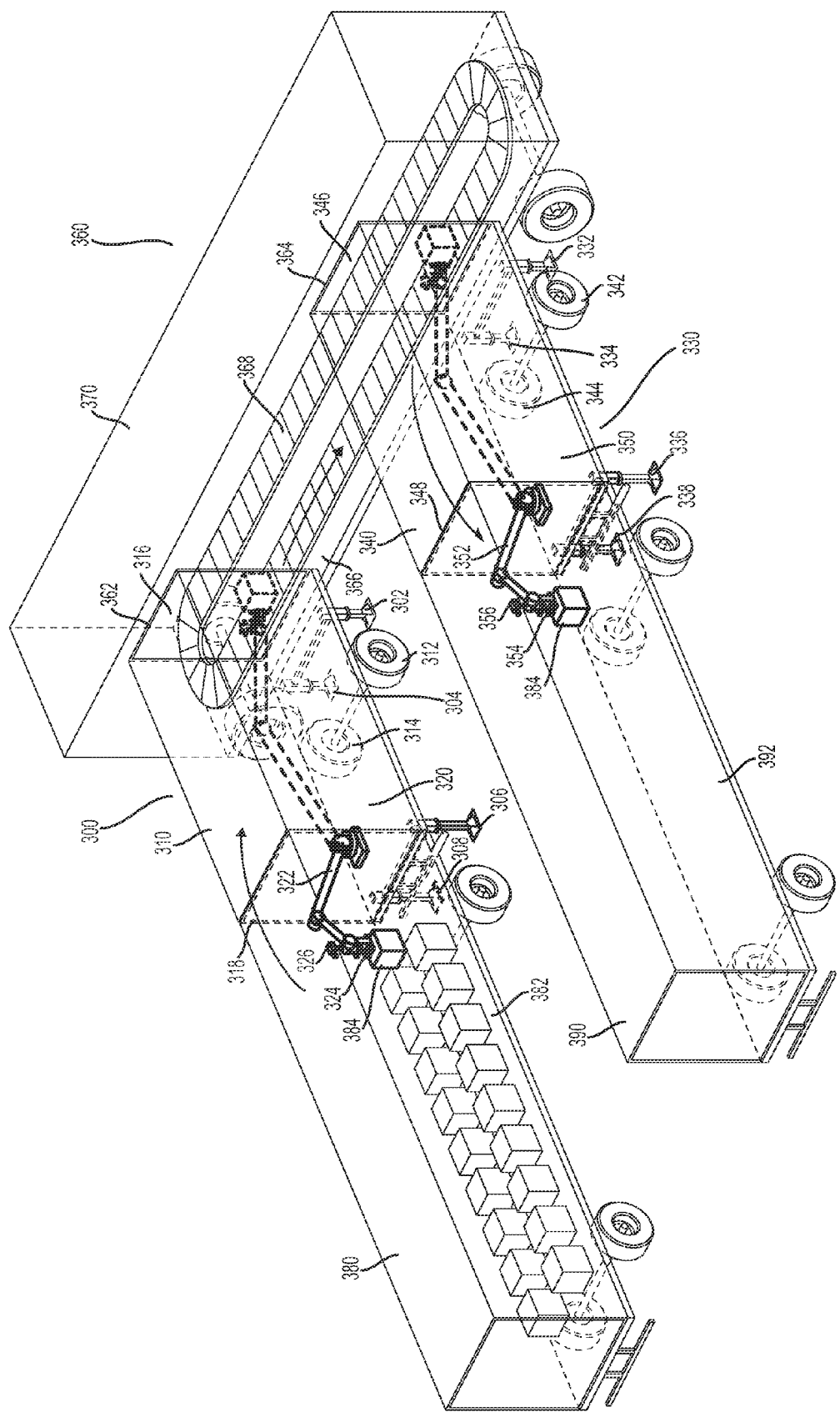
FIG. 3D illustrates movement of a box between the two external trailers from FIG. 3C, according to an example embodiment.

FIG. 3D illustrates movement of a box between the two external trailers from FIG. 3C, according to an example embodiment. In this example, the robotic manipulator 322 may identify a box 384 to move from the external trailer 380, possibly by using sensor data received from optical sensor 326. The robotic manipulator 322 may then pick up the box 384 with gripper 324 and move the box 384 through container 310 onto a conveyor 368 of system trailer 360 for transport to another trailer. In FIG. 3D, the representation of the robotic manipulator 322 with solid lines represents a first position of the robotic manipulator and the representation with dashed lines represents a second position of the robotic manipulator. The box 384 may then be moved along conveyor 368 to a point where it can be picked up by robotic manipulator 352 of system trailer 330. The robotic manipulator 352 may identify the box 384 using sensor data received from optical sensor 356 and pick up the box with gripper 354. The robotic manipulator 352 may then move the box through container 330 into the second external trailer 390. In FIG. 3D, the representation of the robotic manipulator 352 with dashed lines represents a first position of the robotic manipulator and the representation with solid lines represents a second position of the robotic manipulator. Additionally, the arrows represent the motion path of the box 384 as it is moved from the external trailer 380 through the system of connected trailers into external trailer 390.

In this example, alignment of system trailer 300 with both external trailer 380 and system trailer 360 may facilitate movement of the box 384 by the robotic manipulator 322 from the external trailer 380 onto the conveyor 368 without putting excess strain on the system (e.g., making autonomous robotic operation more difficult, risking misplacement/dropping of the box, and/or risking tipping of a trailer). Additionally, alignment of system trailer 330 with both system trailer 360 and external trailer 390 may also facilitate movement of the box 384 from the conveyor 368 into the external trailer 390 by the robotic manipulator 352.

In additional examples, a central control system may simultaneously adjust load levelers of multiple trailers. For instance, the central control system may monitor overall system stability based on current motion and operation of robotic manipulators and/or other trailers components. The control system may determine when a particular system trailer is likely to rock or tip, and may responsively adjust the heights of one or more of the load levelers to compensate and keep all of the connected trailers stable. Different system trailers may be provided with different numbers, placements, and/or types of load levelers that contribute to overall system stability.

Within examples, a central control system may provide instructions to individual system trailers and/or system trailer components in order to direct a particular object through the system to a particular location. Additionally, various control functions involved in the process of moving an object between external trailers (including, e.g., receiving and processing sensor data, identifying objects, determining where to grasp an object, determining where to drop off an object, etc.) may be split between local control systems of individual trailers or robotic manipulators and a central control system.

In further examples, a local control system of a system trailer may perform a system check upon deployment. The system check may confirm expected operation of trailer components, such as one or more robots, conveyors, lights, additional sensors, light curtains, and/or other safety equipment. Further, each trailer may communicate its current system status with the central control system. For instance, a trailer may communicate when it has a system failure or a particular type of system failure. In some examples, if a problem occurs in one of the trailers and the system of trailers has enough redundancy, the central control system may redirect the flow of goods to other trailers in order to avoid the failing trailer. Additionally, the problematic trailer may be taken offline to be accessed by human maintenance personnel.

In further examples, the central control system may continuously analyze the warehouse for efficiency and monitor throughput. Additionally, the central control system may automatically reconfigure trailer placement or recommend options for reconfiguring trailer placement (e.g., to a remote human operator) to remove capacity bottlenecks that are causing reduced overall system throughput (e.g., of objects). For instance, the central control system may identify a particular trailer to be a bottleneck that is causing one or more other trailers (e.g., trailers connected to the particular trailer) to halt operation to wait for the particular trailer to finish one or more of its assigned tasks. In response, the central control system may reposition one or more system trailers to reduce the load on the particular trailer that is the bottleneck. For instance, one or more other trailers performing the same tasks as the particular trailer may be inserted to take load off of the particular trailer that is the bottleneck. In other examples, the central control system may also reposition trailers to adjust for an increase in overall system volume (e.g., by adding more palletizing trailers).

In additional examples, a simulator may be used to perform scenario analysis on different load patterns and recommend appropriate configurations of trailers before setting up the system of connected trailers. For instance, the simulator may be a software system with a user interface that may be controlled by a human operator. The operator may enter typical or expected load patterns, and may then be presented with a visualization of expected system performance with different possible arrangements of trailers. Based on output from a simulator, a particular arrangement of trailers for a particular scenario may be selected.

In some examples, the system trailers may be arranged to perform functions in a particular order (e.g., determined based on output from a simulator). For instance, objects may first be directed to pass through one or more identification trailers, where optical sensing and/or other types of sensing may be used to identify the objects. Next, conveyance systems of one or more trailers may be controlled to transport the objects through one or more sorting trailers in order to direct the already identified objects toward chosen external trailers. After being sorted by one or more components of the sorting trailers, the objects may then be transported through one or more palletizing trailers in order to construct pallets of the objects for delivery to external trailers. In further examples, the system trailers may be arranged within a lot to facilitate performance of this sequence of operations. Other types of sequences of operations may be used by a system of connected trailers as well or instead.

In further examples, additional external trailers may be connected to the system of trailers. For instance, a third external trailer may be connected to a third system trailer with a third robotic truck unloader. In such a scenario, the central control system may identify and direct one or more boxes from both the first external trailer and the third external trailer to the second external trailer. Or, alternatively, the central control system may identify and direct one or more additional boxes from the first external trailer to the third external trailer. In this manner, more complex cross-docking operations may be performed (e.g., a single external trailer may be loaded with five different types of products from five different external trailers for delivery from the lot).

In order to direct boxes to particular destinations, one or more system trailers may be assigned to be sorting trailers which direct boxes to different attached system trailers. For instance, system trailer 360 may direct some boxes to system trailer 300 and other boxes to system trailer 330. In order to direct particular boxes, the sorting trailer may use one or more conveyors, such as conveyor 368. In this example, the conveyor 368 is a conveyor shaped in a loop that may direct objects to different connected trailers. The connected trailers could be connected to different positions on a single side of trailer 360, or to both sides, or to the front and/or rear end as well.

In one example, the conveyor 368 may move an object, such as box 384 until it is positioned in front of a connected system trailer, such as trailer 330. The conveyor 368 may then stop and wait for the robotic manipulator 352 of system trailer 330 to move the box 384 off the conveyor 368 and into the trailer 330. In other examples, the conveyor 368 may move continuously while one or more robotic manipulators move objects to and/or from the conveyor 368.

In other examples, a sorting trailer may include more complex conveyance systems. For instance, a sorting trailer may include two or more levels of conveyors positioned at different corresponding heights within the sorting trailer. In such a system, each level of conveyor may be capable of moving objects to a different location (e.g., different connected system trailers) at the same time. For instance, a first conveyor positioned at a first height may move one box to the right toward one connected system trailer while a second conveyor positioned at a second height may simultaneously move another box to the left toward a different connected system trailers. Multi-level conveyance systems with more than two levels are also possible.

In further examples, a sorting trailer may also include a sorting robotic manipulator to move objects to one of several different conveyors within the system trailer. Accordingly, the sorting robotic manipulator may direct a particular object to a particular connected system trailer by moving the object to a particular conveyor that is moving in the desired direction. In other examples, a sorting robotic manipulator may move objects directly from the sorting trailer into one of several system trailers that are connected to the sorting trailer. More complicated systems with multiple sorting robotic manipulators simultaneously moving objects between multiple conveyors may also be used to increase throughput for a cross-docking operation.

In additional examples, one or more system trailers may be human work cells. Such a trailer may receive materials (e.g., boxes, bags, or products) requiring functions that are difficult to automate. One or more human workers inside the trailer may perform the work that is difficult to automate (e.g., handling fragile products, folding clothes into boxes, etc.). Once that work is completed by the human workers, the trailer may connect back into one of the trailers of the system for additional automated processing.

Figure 4:
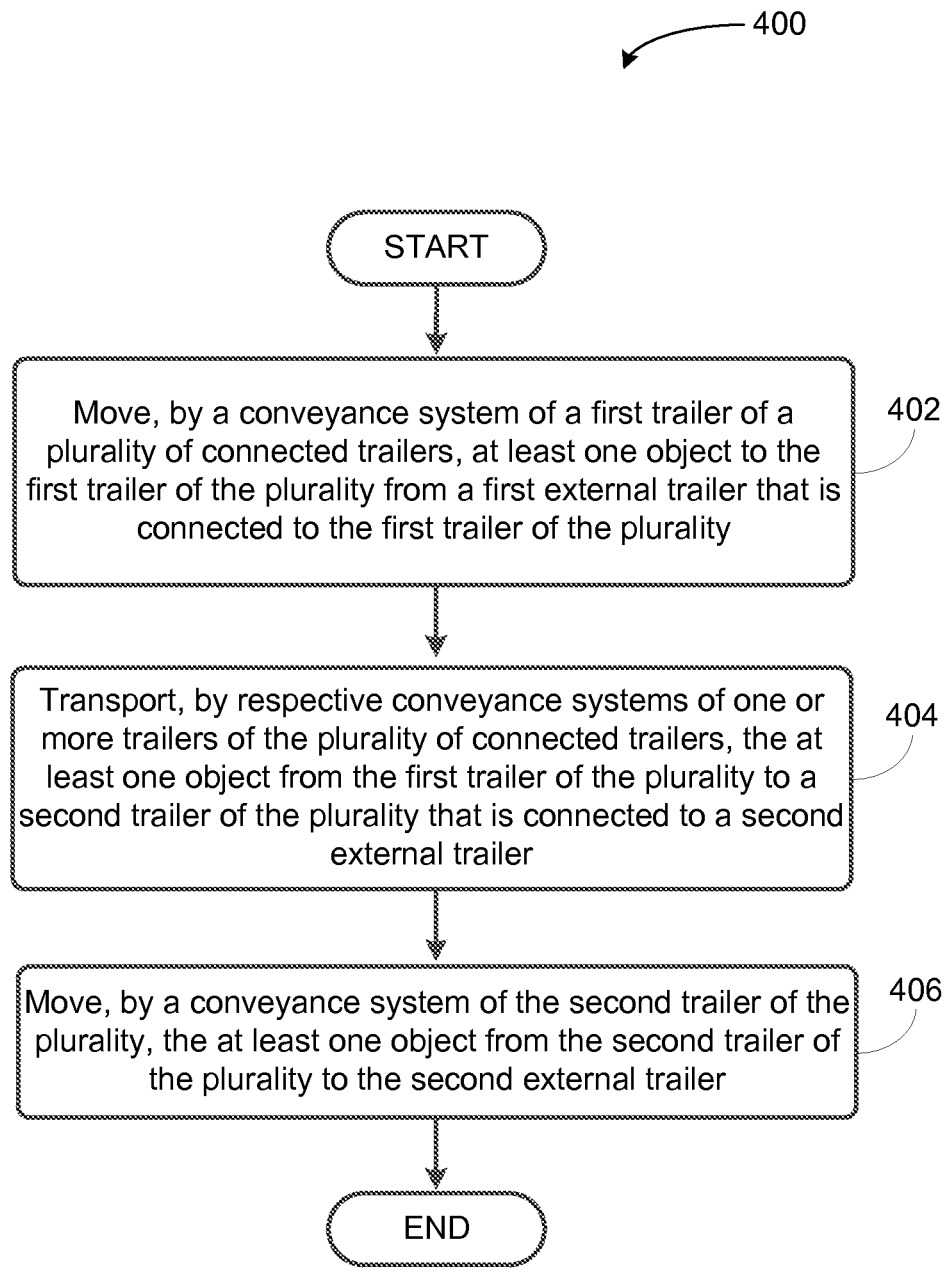
FIG. 4 is a block diagram of a method, according to an example embodiment.

FIG. 4 is a flowchart showing a method 400 that may allow for operation of a system of connected trailers, according to an example embodiment. Method 400 may be carried out by any of the variations of systems and/or system components described herein, such as the system illustrated and described with respect to FIGS. 3A-3D. In further examples, part or all of method 400 may be performed by one or more control systems located within one or more trailers, within a robotic manipulator, and/or in remote communication with other system components. Additionally, various alternative embodiments may include other types of trailers, robotic manipulators, conveyors, and/or other conveyance systems than those specifically illustrated in FIGS. 3A-3D.

As shown by block 402 of FIG. 4, method 400 may initially involve moving, by a conveyance system of a first trailer of a plurality of connected trailers, at least one object to the first trailer of the plurality from a first external trailer that is connected to the first trailer of the plurality. The conveyance system of the first system trailer may include one or more robotic manipulators and/or one or more conveyors. The first system trailer and the first external trailer may be connected so that openings of the two trailers are aligned to allow for autonomous movement of objects between the two trailers.

As shown by block 404 of FIG. 4, method 400 may further involve transporting, by respective conveyance systems of one or more trailers of the plurality of connected trailers, the at least one object from the first trailer of the plurality to a second trailer of the plurality that is connected to a second external trailer. To transport an object to the second system trailer, the object may be moved through one or more connected system trailers. Additionally, the object may be moved by conveyance systems of one or more of the trailers, which may include different types of conveyances systems (e.g., a robot arm from one trailer and a conveyor from another trailer). In some examples, the objects may be moved through one or more trailers where other types of operations are performed as well, such as determining object metrology, sorting objects, and/or palletizing objects.

As shown by block 406 of FIG. 4, method 400 may further involve moving, by a conveyance system of the second trailer of the plurality, the at least one object from the second trailer of the plurality to the second external trailer. For instance, a group of incoming objects may be directed through the system of connected trailers to a particular external trailer for delivery off the lot. In some examples, another external trailer may then be connected to the same second system trailer to allow the system to perform additional cross-docking operations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system, comprising:
    a plurality of trailers arranged such that a given trailer of the plurality is connected to at least one other trailer of the plurality, wherein the plurality of trailers comprises a plurality of respective conveyance systems to transport objects between connected trailers; and
    a control system configured to:
        cause a conveyance system of a first trailer of the plurality to move at least one object to the first trailer from a first external trailer that is connected to the first trailer;
        cause respective conveyance systems of one or more trailers of the plurality to transport the at least one object from the first trailer of the plurality to a second trailer of the plurality that is connected to a second external trailer; and
        cause a conveyance system of the second trailer of the plurality to move the at least one object to the second external trailer.

2. The system of claim 1, wherein the plurality of trailers comprises a modular cross-docking system, wherein each trailer of the plurality is configured to perform at least one respective dedicated function to effectuate operation of the modular cross-docking system.

3. The system of claim 2, wherein each trailer of the plurality comprises at least one particular respective component to perform the at least one respective dedicated function, wherein the at least one particular respective component comprises at least one of a robotic truck loader, a sorting conveyor, a sorting robot, and a palletizing robot.

4. The system of claim 1, wherein:
    the first trailer of the plurality comprises a first robotic manipulator that is configured to move the at least one object from the first external trailer to the first trailer of the plurality; and
    the second trailer of the plurality comprises a second robotic manipulator that is configured to move the at least one object from the second trailer of the plurality to the second external trailer.

5. The system of claim 1, wherein a trailer of the plurality comprises an enclosed, rectangular container with at least one openable surface for connection to another trailer of the plurality.

6. The system of claim 1, wherein the one or more trailers of the plurality comprise a sorting trailer, wherein the sorting trailer comprises one or more conveyors configured to transport a given object to a particular one of at least two trailers of the plurality that are connected to the sorting trailer.

7. The system of claim 6, wherein the sorting trailer comprises at least a first side door for connection to a first trailer of the plurality and a second side door for connection to a second trailer of the plurality.

8. The system of claim 6, wherein the one or more conveyors in the sorting trailer comprise at least:
 a first conveyor positioned at a first height that is configured to direct one or more objects toward a first end of the sorting trailer; and
 a second conveyor positioned at a second height that is configured to simultaneously direct one or more other objects toward a second end of the sorting trailer that is opposite the first end.

9. The system of claim 6, wherein the sorting trailer further comprises a sorting robotic manipulator configured to move the given object to a particular conveyor of the one or more conveyors in order to direct the given object to the particular one of the at least two trailers of the plurality that are connected to the sorting trailer.

10. The system of claim 1, wherein the one or more trailers of the plurality comprise a palletizing trailer, wherein the palletizing trailer comprises a palletizing robotic manipulator configured to form a pallet comprising a plurality of objects including the at least one object to transport to the second external trailer.

11. The system of claim 1, wherein the control system is further configured to:
 cause a conveyance system of a third trailer of the plurality to move at least one additional object to the third trailer from a third external trailer that is connected to the third trailer of the plurality;
 cause respective conveyance systems of one or more trailers of the plurality to transport the at least one additional object from the third trailer of the plurality to the second trailer of the plurality; and
 cause the conveyance system of the second trailer of the plurality to move the at least one additional object to the second external trailer.

12. The system of claim 1, further comprising a control trailer that is unconnected to the plurality of trailers, wherein the control trailer comprises a control system and a network communication system, wherein the control system is configured to use the network communication system to communicate instructions to respective local control systems of the plurality of trailers to enable synchronized autonomous operation of at least one mechanically operable device in each of the plurality of trailers.

13. The system of claim 1, wherein the control system is further configured to provide instructions to move the plurality of trailers in order to position the plurality of trailers within a lot before the first external trailer is connected to the first trailer of the plurality.

14. The system of claim 1, wherein a trailer of the plurality comprises:
 at least one front leg positioned at a front end of the trailer, wherein the at least one front leg has an adjustable height to a ground surface in order to align the front end of the trailer with a front-connected trailer; and
 at least one back leg positioned at a back end of the trailer, wherein the at least one back leg has an adjustable height to a ground surface in order to align the back end of the trailer with a back-connected trailer.

15. The system of claim 14, wherein:
 the at least one front leg comprises a front left leg positioned at a left side of the front end of the trailer and a front right leg positioned at a right side of the front end of the trailer;
 the at least one back leg comprises a back left leg positioned at a left side of the back end of the trailer and a back right leg positioned at a right side of the back end of the trailer; and
 each of the front left leg, the front right leg, the back left leg, and the back right leg has an independently adjustable respective height to the ground surface in order to align the trailer with the front-connected trailer and the back-connected trailer.

16. A method, comprising:
 moving, by a conveyance system of a first trailer of a plurality of connected trailers, at least one object to the first trailer of the plurality from a first external trailer that is connected to the first trailer of the plurality;
 transporting, by respective conveyance systems of one or more trailers of the plurality of connected trailers, the at least one object from the first trailer of the plurality to a second trailer of the plurality that is connected to a second external trailer; and
 moving, by a conveyance system of the second trailer of the plurality, the at least one object from the second trailer of the plurality to the second external trailer.

17. The method of claim 16, further comprising:
 moving the at least one object to the first trailer of the plurality from the first external trailer with a first robotic manipulator fixed within the first trailer of the plurality; and
 moving the at least one object from the second trailer of the plurality to the second external trailer with a second robotic manipulator fixed within the second trailer of the plurality.

18. The method of claim 16, wherein the plurality of connected trailers comprises a sorting trailer comprising one or more sorting conveyors, the method further comprising:
 transporting, by at least one of the one or more sorting conveyors, a given object of the at least one object to a particular one of at least two trailers of the plurality that are connected to the sorting trailer.

19. A control system, comprising:
 at least one processor; and
 data storage comprising instructions executable by the at least one processor to the cause the control system to perform functions comprising:
 identifying at least one object within a first external trailer for transport to a second external trailer;
 causing a conveyance system of a first trailer of a plurality of connected trailers to move the at least one object to the first trailer of the plurality from the first external trailer, wherein the first external trailer is connected to the first trailer of the plurality;
 causing respective conveyance systems of one or more trailers of the plurality of connected trailers to transport the at least one object from the first trailer of the plurality to a second trailer of the plurality that is connected to the second external trailer; and
 causing a conveyance system of the second trailer of the plurality to move the at least one object from the second trailer of the plurality to the second external trailer.

20. The control system of claim 19, the functions further comprising:
 identifying at least one additional object within the first external trailer for transport to a third external trailer;
 causing the conveyance system of the first trailer of the plurality to move the at least one additional object to the first trailer of the plurality from the first external trailer;

causing respective conveyance systems of one or more trailers of the plurality of connected trailers to transport the at least one additional object from the first trailer of the plurality to a third trailer of the plurality that is connected to the third external trailer; and causing a conveyance system of the third trailer of the plurality to move the at least one additional object from the third trailer of the plurality to the third external trailer.

21. The control system of claim 19, the functions further comprising:

causing a plurality of trailers to undergo respective movements within a lot in order to connect the plurality of trailers before the first external trailer is connected to the first trailer of the plurality.

22. The control system of claim 19, the functions further comprising:

identifying one or more additional external trailers expected to arrive at the lot; and causing at least some of the plurality of connected trailers to undergo respective movements in order to reposition the plurality of connected trailers within the lot to accommodate the one or more additional external trailers.

23. The control system of claim 19, the functions further comprising:

identifying at least one function to be performed on one or more objects to be transported between a particular external trailer and the system of connected trailers; and causing at least some of the plurality of connected trailers to undergo respective movements in order to position a particular trailer of the plurality to enable connection between the particular trailer of the plurality and the particular external trailer, wherein the particular trailer of the plurality comprises at least one component configured to perform the at least one function.

24. The control system of claim 19, the functions further comprising:

determining a number of incoming external trailers expected to arrive at the lot within a particular time period;

based on the number of incoming external trailers, determining one or more trailers of the plurality to make available for connection to respective external trailers, wherein each of the one or more trailers of the plurality comprises a robotic truck unloader; and causing at least some of the plurality of connected trailers to undergo respective movements in order to position the one or more trailers of the plurality to allow for connection between the one or more trailers of the plurality and respective external trailers.

25. The control system of claim 19, the functions further comprising:

receiving an indication of a system failure in a particular trailer of the plurality of connected trailers;

redirecting the at least object through the plurality of connected trailers in order to avoid passing through the particular trailer.

26. The control system of claim 19, the functions further comprising:

identifying a particular trailer to be a bottleneck that is causing reduced overall throughput of the plurality of connected trailers;

causing at least some of the plurality of connected trailers to undergo respective movements in order to reduce a number of objects passing through the particular trailer.

* * * * *